United States Patent [19]

Ruoff

[11] Patent Number: 4,553,393
[45] Date of Patent: Nov. 19, 1985

[54] MEMORY METAL ACTUATOR

[75] Inventor: Carl F. Ruoff, LaCrescenta, Calif.

[73] Assignee: The United States of America as represented by the Administrator of the National Aeronautics and Space Administration, Washington, D.C.

[21] Appl. No.: 527,613

[22] Filed: Aug. 26, 1983

[51] Int. Cl.[4] .............................................. F03G 7/06
[52] U.S. Cl. ...................................... 60/528; 60/527; 337/140
[58] Field of Search .................... 60/527, 528, 529; 337/140

[56] References Cited

U.S. PATENT DOCUMENTS

| | | | |
|---|---|---|---|
| 2,809,253 | 10/1957 | Broekhuysen | 200/113 |
| 3,012,882 | 12/1961 | Muldawer et al. | 75/134 |
| 3,174,851 | 3/1965 | Buehler et al. | 75/170 |
| 3,403,238 | 9/1968 | Buehler et al. | 337/393 |
| 3,594,674 | 7/1971 | Wilson et al. | 337/139 |
| 3,594,675 | 7/1971 | Wilson et al. | 337/140 |
| 3,634,803 | 1/1972 | Wilson et al. | 337/123 |
| 3,652,969 | 3/1972 | Wilson et al. | 337/140 |
| 3,676,815 | 7/1972 | Du Rocher | 337/140 |
| 3,684,994 | 8/1972 | Tyler | 337/140 |
| 3,703,693 | 11/1972 | Levinn | 337/1 |
| 3,725,835 | 4/1973 | Hopkins et al. | 337/140 |
| 3,872,415 | 3/1975 | Clarke | 337/140 |
| 3,893,055 | 7/1975 | Jost et al. | 337/140 |
| 3,922,591 | 11/1975 | Olsen | 318/676 |
| 4,205,293 | 5/1980 | Melton et al. | 337/140 |
| 4,450,686 | 5/1984 | Banks | 60/527 |

FOREIGN PATENT DOCUMENTS 45250  2/1982  European Pat. Off. ............ 60/528

Primary Examiner—Stephen F. Husar
Attorney, Agent, or Firm—Paul F. McCaul; John R. Manning; Thomas H. Jones

[57] ABSTRACT

A mechanical actuator can be constructed by employing a plurality of memory metal actuator elements in parallel to control the amount of actuating force. In order to facilitate direct control by digital control signals provided by a computer or the like, the actuating elements may vary in stiffness according to a binary relationship. The cooling or reset time of the actuator elements can be reduced by employing Peltier junction cooling assemblies in the actuator.

22 Claims, 7 Drawing Figures

MEMORY METAL ACTUATOR

BACKGROUND OF THE INVENTION

Origin of the Invention

The Invention described herein was made in the performance of work under a NASA contract and is subject to the provisions of Section 305 of the National Aeronautics and Space Act of 1958, Public Law 85-568 (72 STAT 435; 42 USC 2457).

FIELD OF THE INVENTION

The present invention relates to mechanical actuators which employ memory metals. Memory metals are alloys which will quickly snap from their cold-formed shapes to their stiff hot-formed shapes when a critical temperature is passed. Upon cooling they will return to cold malleability condition, becoming quite compliant. The best known and most readily available memory metal is Nitinol, an alloy of nickel and titanium. With a temperature change of as little as 18° F., Nitinol can exert a force of as much as 60,000 psi when exerted against a resistance to changing its shape.

More particularly, the present invention relates to memory metal actuators for use in electro-mechanical servocontrol systems. Such systems require prime movers and actuators which are electrically controlled and have a mechanical output.

DESCRIPTION OF THE PRIOR ART

Typically, prior art control systems employ miniature precision servomotors, which are expensive to build and often have high speed output shaft rotations which require reduction through expensive precision gear trains. In addition, the electrical control of these motors is by variation of the magnitude of the control signal. In a system which is computer controlled, there must be at least one conversion of digital-to-analog or vice-versa.

Several prior art patents disclose actuators which employ memory metals. U.S. Pat. No. 3,725,835 to Hopkins, et al. discloses an actuator which includes a pair of memory metal elements which are in opposition to one another and are independently heated in order to actuate and reset the device. Heating of the memory metal elements is accomplished by passing an electric current through them.

U.S. Pat. No. 3,922,591 to Olsen also discloses a system in which a memory metal element is heated to its critical temperature by means of an electric current. This patent discloses the use of a bias current to maintain the memory metal within its operating temperature range. U.S. Pat. Nos. 3,634,803 to Wilson, et al. and 3,652,969 to Wilson, et al. both disclose heating of a memory metal material by means of an electric current.

The use of memory metals is also disclosed in the following U.S. Pat. Nos. 2,809,253 to Broekhuysen; 3,012,882 to Muldawer, et al.; 3,174,851 to Buehler, et al.; 3,403,238 to Buehler, et al.; 3,594,674 to Wilson; 3,594,675 to Wilson; 3,676,815 to DuRocher; 3,684,994 to Tyler; 3,703,693 to Levinn; 3,872,415 to Clarke; 3,893,055 to Jost, et al.; and 4,205,293 to Melton, et al.

SUMMARY OF THE INVENTION

The present invention is directed to an actuator which includes a combination of parallel elements of memory metals, which are selectively heated above their critical temperature in order to achieve a desired actuating force. In the preferred embodiment of the invention, heating is accomplished by the passage of internal electrical currents which are switched by means of transistor switches. The memory metal elements may have identical stiffnesses so as to exert equal forces upon actuation. Alternatively, the stiffness of the elements may vary with respect to one another according to a binary relationship. Such construction facilitates direct control of the actuator by digital computers. By employing memory metals to function as actuating elements furnishing torques or forces directly to a load, the need for intervening transmissions or precision motors is eliminated.

The invention is also directed to mechanical actuators which employ memory metal elements and include cooling elements for the memory metal actuators which operate in accordance with the Peltier effect. The Peltier effect is a phenomenon in which heat will be either absorbed or generated at a junction between two dissimilar metals across which a current passes. Peltier junctions have been employed in the past as coolers for electronic packages. In the present invention, a first Peltier junction is located adjacent the memory metal actuator element and a second Peltier junction is spaced away from the actuator element. Current is passed through the metals which form the junctions so as to cause heat to be transferred from the first junction adjacent the actuator element to the second junction. A heat sink may be attached to the second junction to dissipate the transferred heat. The provision of the Peltier junction cooling system facilitates rapid resetting of the actuator element to a temperature below its critical temperature, thus enabling faster cycling speeds to be achieved.

BRIEF DESCRIPTION OF THE DRAWINGS

The invention will be described with reference to the accompanying, drawings, wherein.

DETAILED DESCRIPTION OF THE DRAWINGS

Figure 1A:
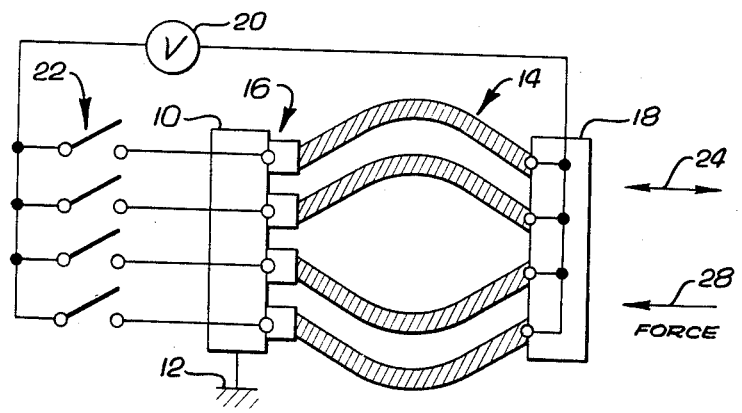
FIG. 1A is a schematic representation of an actuator according to the present invention in which the memory metal elements are in their cold state.

The following description is of the best presently contemplated mode of carrying out the invention. This description is made for the purpose of illustrating the general principles of the invention and should not be taken in a limiting sense. The scope of the invention is best determined by the appended claims.

Referring to FIG. 1, the present invention is directed to an actuator which includes a plurality of memory metal actuator elements which may be selectively heated above their critical temperature in order to vary the actuating force. The actuator includes a support element 10 which is illustrated as being connected to mechanical ground at 12. A plurality of memory metal elements 14 having thermostats 16 at an end thereof are connected to the support element 10. The other ends of the actuator elements 14 are connected to a movable output element 18 which in turn will be connected to a load (not shown) which is to be driven.

The actuator elements 14 may be made of various memory metal materials, with Nitinol being the most common. The actuator elements form part of an electric circuit which includes a power supply 20 and a plurality of switches 22 which are connected in parallel to control the passage of current through the individual actuators 14.

Figure 1B:
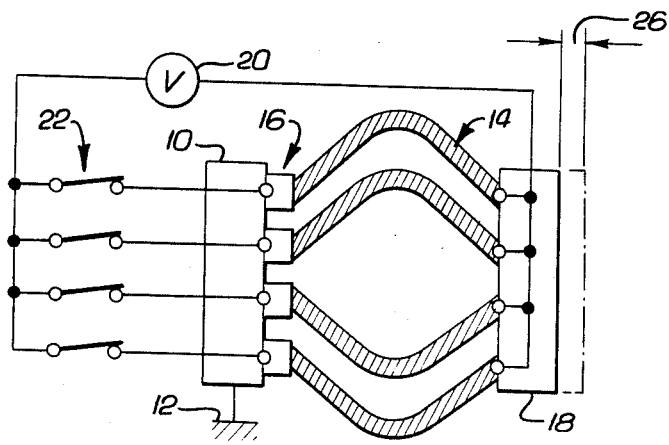
FIG. 1B is a schematic of the actuator showing the memory metal elements after they have been heated to their critical temperature and have assumed their hot-formed shape.

In FIG. 1A, the memory metal actuator elements 14 are shown in their cold state, i.e., at a temperature below the critical temperature of the memory metal. In this state, the actuator elements are malleable and can be formed to a desired shape or position by the application of external force. The actuator shown in FIG. 1 is a linear actuator and the output element 18 will move in a direction indicated by an arrow 24. When current is passed through one (or more) of the actuator elements 14 so as to increase the temperature of the actuator element(s) above the critical temperature, the heated actuator element(s) will rapidly exert a force which causes them to attempt to move to the stiff hot-formed shape, as indicated in FIG. 1B. This will cause the output element 18 to move a distance indicated at 26. In FIG. 1A, the actuator elements 14 have been cold-stretched into a straighter shape than their original hot-formed shapes, and the direction of the force exerted when the critical temperature is exceeded will thus be as indicated by an arrow 28. The direction of the force is dependent upon the difference in shape between the hot-formed and current state, and whether the elements are being heated or cooled. For example, if the actuator elements 14 had been cold-formed into a more compact configuration than the hot-formed shape, the direction of the force upon reaching the critical temperature would be opposite the arrow 28.

It should be noted that not all of the switches 22 will be closed simultaneously and therefore only some of the actuator elements 14 will be heated beyond their critical temperature. Since the remaining elements are malleable, however, they will present relatively low resistance to the heated actuator elements which snap back to their hot-formed shape.

In FIG. 1, a plurality of identical actuator elements are employed. By selectively closing the switches 22, the degree of actuating force can be controlled. Thus, if a relatively low actuating force is desired, only one of these switches 22 is closed, with additional switches being closed as the force requirement increases. Depending upon the load, the difference in force will result in a different amount of movement of the load.

Thus, each actuator element 14 is selectively heated by closing a switch connected in series with it, which causes an electrical current to flow through the element. The element is heated by its electrical resistivity. To prevent overheating, and subsequent loss of the hot-formed shape, each element is protected by its associated thermostat 16.

Figure 2:
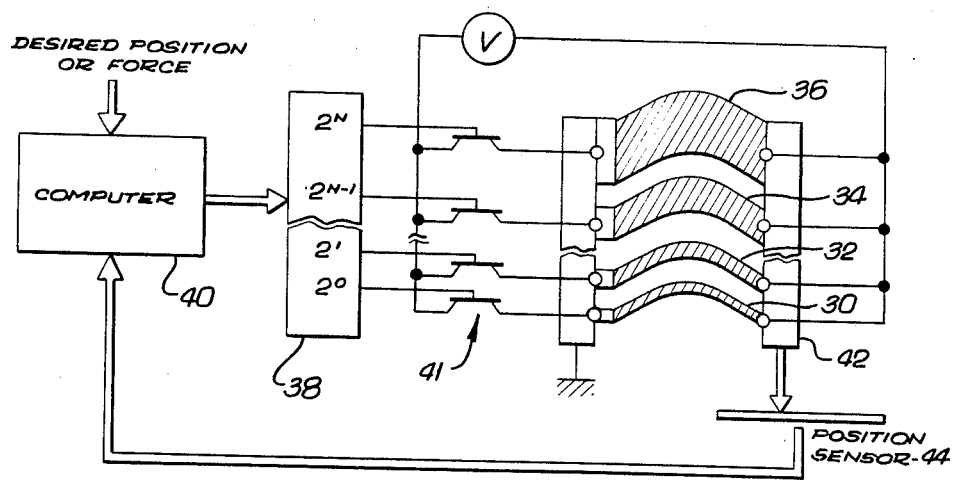
FIG. 2 is a schematic representation of a proportional actuator according to the present invention.

A preferred embodiment of the invention is illustrated in FIG. 2. In this embodiment, actuator elements 30, 32, 34 and 36 having different thicknesses, and hence different stiffnesses, are employed. The actuator elements are made so as to have a binary relationship to one another in their stiffness and thus the force which they exert when moving to their hot-formed shape. Thus, each element will have twice the stiffness of its thinner neighbor. Because of this binary relationship, a binary control signal 38 from a computer 40 or similiar control device can be used to directly control the operation of the actuator without the necessity of converting the digital control signal to an analog signal. The binary output signal 38 can be used to control switching transistors 41 to selectively pass current through the actuator elements 30–36. FIG. 2 illustrates a closed loop control system in which the position of the output element 42 of the actuator is monitored by a position sensor 44 and fed back to the computer 40. This position is compared to the desired position or force and the control signal 38 is generated as a function of the difference between the desired and actual positions.

Figure 3:
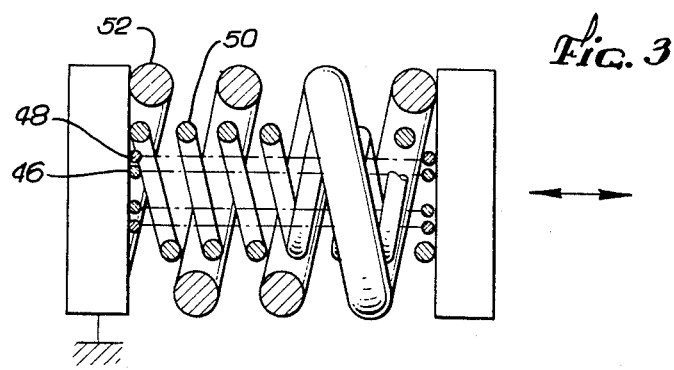
FIG. 3 is a schematic representation showing the use of helical memory metal elements.

The actuator elements 30–36 of FIG. 2 are strips of material and have a relatively limited movement range. In order to provide a linear actuator having a greater range, helical actuator elements 46, 48, 50 and 52 as shown in FIG. 3 may be employed. As is the case with the actuator elements 30–36, the actuator elements 46–52 may have a binary stiffness relationship so that they can be directly controlled by a digital control signal.

Figure 4:
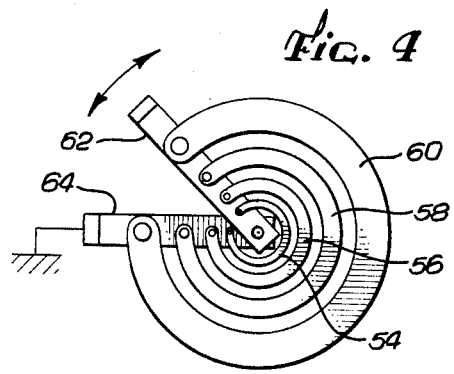
FIG. 4 is a schematic representation showing a rotary embodiment of the actuator of the present invention.

A limited range rotary actuator may be formed by forming the memory metal elements into torsional springs 54, 56, 58 and 60 as shown in FIG. 4. These elements may also be arranged in a binary relationship of stiffness or may employ a plurality of identical elements as used in the embodiment shown in FIG. 1. In this embodiment, the torsional elements 54–60 are attached to an output element 62 which is pivotally connected to a stationary support element 64.

When cool, Nitinol is rather malleable, and will not exert much spring force. If the load on the output element exerts a unidirectional restoring force upon the actuator (as when under the influence of gravity or a separate spring), the load will tend to restore the actuator to the cold shape. For loads which will not restore the actuator elements to their starting shapes, and/or for faster restoration, a second set of memory metal actuators can be placed in physical opposition to the first set. Fast response may also be enhanced by causing a bias current to flow continuously through the actuator elements to keep them just below their critical temperatures. This approach will also tend to eliminate response variations caused by ambient temperature changes.

Figure 5:
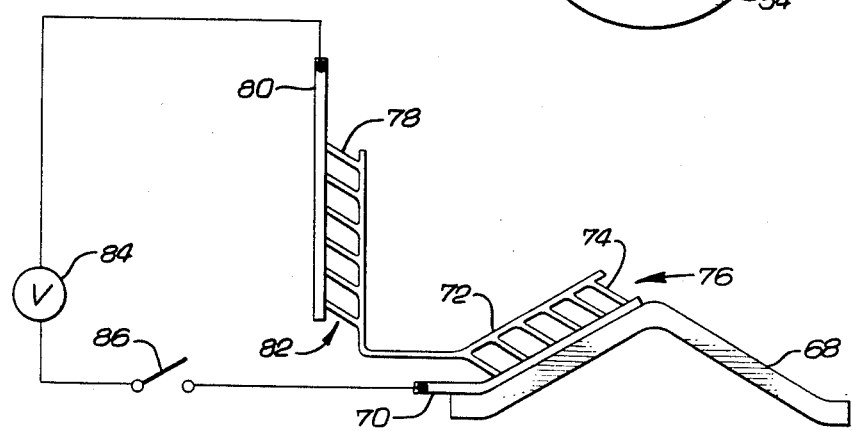
FIG. 5 is a schematic representation of a first embodiment of an actuator with a Peltier effect cooling assembly.
Figure 6:
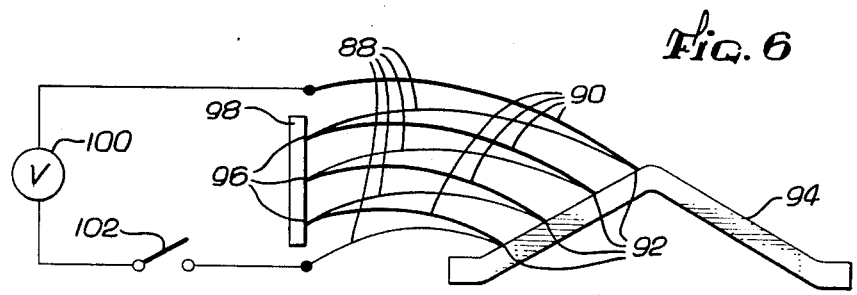
FIG. 6 is a schematic representation of a second embodiment of an actuator with a Peltier effect cooling assembly.

The actuator elements of the present invention can be heated very quickly by applying internal electrical currents. A large pulse of current can heat the element almost instantly. However, it is quite difficult to rapidly cool the actuator elements to below their critical temperatures so as to reset the actuator. This is especially so if a bias current as discussed above it employed. The present invention includes means for shortening the reset time of the actuator elements. Referring to FIGS. 5 and 6, the present invention employs Peltier junctions to rapidly dissipate heat from the memory metal actuating elements. In FIG. 5, a memory metal actuating element 68 has a metal strip 70 bonded to a portion of its upper surface. A dissimilar metal is formed into a strip 72 having a plurality of extensions 74 along a portion of its length and is bonded to the strip 70 to form junctions 76. The strip 72 also includes a plurality of extensions 78 which are bonded to a metal heat sink 80 to form a second group of junctions 82. The metal sink 80 is formed of the same metal as the strip 70. A voltage source 84 is employed to provide a current through the metal elements 70, 72 and 80.

A Peltier junction operates by transferring heat from one side of a junction between two dissimilar metals to the other under the influence of an electrical current. The junctions 76 and 82 are Peltier junctions and by applying current in the proper direction, heat can be caused to flow from the junctions 76 to the junctions 82. The cold side of the junction can thus be used as a refrigerated heat sink. In FIG. 5, the heat generated by the actuator 68 will be absorbed by the metal elements 70 and transferred to the heat sink 80 by means of the Peltier effect. By employing a number of parallel junctions, the heat transfer capabilities can be maximized.

Once it is desired to deactivate the memory metal actuator element 68, its heat source is cut off and the Peltier junction is turned on by closing a switch 86. This initiates the heat transfer operation resulting from the Peltier effect. The Peltier current may even be turned on before the actuation of the actuator element has ended, provided that the heat transfer does not cause the temperature of the actuator element to fall below the critical temperature before the desired time.

Since all dissimilar metals act as thermocouples, the memory metal itself may be used as one of the plates of the Peltier junction. In such a case, the strip 70 in FIG. 5 would not be used and the extension 74 would be connected directly to the actuating element 68. In addition, the heat sink 80 would be formed of the same material as the actuator element 68, e.g., Nitinol. Presently, the thermoelectrical properties of Nitinol are not widely known and the heat transferring ability of such a construction may not be as great as the case where a separate metal contact to the actuator is employed.

As an alternative to the parallel Peltier circuit shown in FIG. 5, a series circuit as shown in FIG. 6 may be employed. In this arrangement, a plurality of first metal strips 88 and second metal strips 90 are employed. These strips are flexible strips which are located to form first Peltier junctions 92 adjacent the actuating element 94 and second Peltier junctions 96 adjacent a heat sink 98. Current is applied by means of a voltage supply 100 through a switch 102. Heat will be transferred from the junctions 92 to the junctions 96, where the heat will be dissipated by the heat sink 98.

In structures in which the cooling demands are relatively minimal, the Peltier junctions need not be attached along the length of the actuator but simply be provided at one or both ends of the actuator. In the embodiment shown in FIGS. 5 and 6, flexible connectors are employed to accomodate the movement of the memory metal actuator. Alternately, the cooling system could be designed so that the elements are fixed and come into contact with the actuator only when the actuator assumes its hot-formed shape.

I claim:

1. A mechanical actuator comprising:
a fixed position support element;
an output element which is movable with respect to the support element;
a plurality of actuator elements formed of memory metal material, each actuator element having a first end coupled to the support element and a second end coupled to the output element, wherein when an actuator element is heated above a critical temperature it will rapidly attempt to move to a predetermined hot-formed shape; and
control means for selectively heating the actuator elements to control the amount of force exerted against the output element with the forces exerted by the actuator elements being related to each other in a binary fashion.

2. An actuator according to claim 1 wherein the control means comprises means for passing current through each of the actuator element and switching means for controlling current flow through each of the actuator elements.

3. An actuator according to claim 2 wherein the switching means includes a plurality of switches and one for opening and closing the current path for each actuator element, wherein the actuator includes a control device for providing binary control signals directly to the switches.

4. An actuator according to claim 3 wherein the switches are transistor switches.

5. An actuator according to claim 3 wherein the control device is a digital computer.

6. An actuator according to claim 1 further including means for dissipating heat from the actuator elements by means of the Peltier effect.

7. A memory metal mechanical actuator, comprising:
a fixed support element;
an output element which is movable with respect to the support element;
a plurality of memory metal actuator elements connected between the support element and output element in a mechanically parallel configuration, wherein the actuator elements are malleable when they are below a critical temperature and rapidly attempt to move to a predetermined hot-formed shape when heated above the critical temperature thereby to exert a force on the output element, wherein the stiffnesses of the actuator elements and thus the force exerted by them when moving toward their hot-formed shape have a binary relationship; and
control means for selectively heating the actuator elements above their critical temperature in response to binary control signals.

8. An actuator as in claim 7 wherein the control means comprises means for passing electric current through the actuator elements and a plurality of switches for selecting which actuator elements current is to be applied to, wherein the switches are controlled by the binary control signals.

9. An actuator as in claim 8 including a thermostat coupled to each actuator element to limit the maximum temperature of the actuator elements.

10. An actuator as in claim 7 wherein the actuator elements are formed of Nitinol.

11. An actuator as in claim 7 wherein the actuator is a linear actuator.

12. An actuator as in claim 11 wherein the actuator elements have a strip configuration.

13. An actuator as in claim 11 wherein the actuator elements have a helical configuration.

14. An actuator as in claim 7 wherein the actuator is a rotary actuator in which the output element is pivotally mounted with respect to the support element and the actuator elements have a substantially ring-shaped configuration.

15. An actuator as in claim 8 including cooling means for dissipating heat from the actuator elements, said cooling means operating by means of the Peltier effect.

16. A mechanical actuator comprising:

an actuator element formed of a memory metal material, said actuator element being malleable below a critical temperature and rapidly assuming a predetermined hot-formed shape when heated above the critical temperature;

means for heating the actuator element to the critical temperature to cause it to assume its hot-formed shape; and cooling means for dissipating heat from the actuator element to cause its temperature to rapidly fall below the critical temperature, said cooling means operating by the Peltier effect.

17. An actuator according to claim 16 wherein the cooling means comprises:

a first metal element which thermally contacts the actuator element when cooling is desired;

a second metal element having a first portion positioned to contact the first metal element to form a first junction;

a third metal element of the same type of metal as the first metal element, said third metal element contacting a second portion of the second junction which is spaced from the actuator element; and current means for passing current through the metal elements in a direction which causes heat to be transferred from the first junction to the second junction.

18. An actuator according to claim 17 wherein the first metal element is bonded to the actuator element, the second metal element includes a flexible portion between the first and second portions, and the third metal element is maintained in a fixed position.

19. An actuator according to claim 18 wherein the first portion of the second metal element includes a plurality of extensions which contact the first metal element to form a plurality of first junctions and wherein the second portion of the second metal element includes a plurality of extensions which contact the third metal element to form a plurality of second junctions.

20. An actuator according to claim 17 wherein the third metal element includes an end portion which contacts the actuator element when cooling is desired, said actuator further including:

a fourth metal element of the same metal as the second metal element, said fourth metal element having a first portion which contacts the end portion of the third metal element to form a third junction; and a fifth metal element of the same metal as the first and third metal elements, said fifth metal element contacting a portion of the fourth metal element to form a fourth junction;

wherein the current means passes current through the metal elements in a series fashion to transfer heat from the first junction to the second junction and from the third junction to the fourth junction.

21. an actuator according to claim 20 including a heat sink contacting the second and fourth junctions.

22. An actuator according to claim 16 wherein the cooling means comprises;

a first metal element having a first portion which contacts the actuator element when cooling is desired to thereby form a first junction;

a second metal element of the same metal as the actuator element, said second element contacting a second portion of the first element to thereby form a second junction; and current means for passing current through the actuator element, first metal element and second metal element in a direction which causes heat to be transferred from the first junction to the second junction.

* * * * *